United States Patent [19]
Kanai et al.

[11] Patent Number: 5,786,935
[45] Date of Patent: Jul. 28, 1998

[54] SCOPE

[75] Inventors: Moriyasu Kanai; Ryota Ogawa, both of Tokyo, Japan

[73] Assignee: Asahi Kogaku Kogyo Kabushiki Kaisha, Tokyo, Japan

[21] Appl. No.: 687,269

[22] Filed: Jul. 25, 1996

Related U.S. Application Data

[63] Continuation of Ser. No. 330,257, Oct. 27, 1994, abandoned.

[30] Foreign Application Priority Data

Oct. 27, 1993 [JP] Japan ............................ 5-291270

[51] Int. Cl.$^6$ .......................... G02B 25/04; G02B 7/00
[52] U.S. Cl. ...................... 359/504; 359/367; 359/431; 359/503
[58] Field of Search ................ 359/362, 399–412, 359/707, 599, 601, 367, 503–505; 33/245–252

[56] References Cited

U.S. PATENT DOCUMENTS

| | | | |
|---|---|---|---|
| 1,971,066 | 8/1934 | Eppenstein | 359/707 |
| 2,846,918 | 8/1958 | Miles | 359/505 |
| 4,111,561 | 9/1978 | Plummer | 359/707 |
| 4,172,636 | 10/1979 | Yanagimachi | 359/504 |
| 4,558,922 | 12/1985 | Smith | 354/200 |
| 4,726,670 | 2/1988 | Sherrard | 359/504 |
| 4,892,399 | 1/1990 | Ahn | 359/431 |
| 5,138,487 | 8/1992 | Ahn | 359/431 |
| 5,245,469 | 9/1993 | Goto | 359/362 |
| 5,276,552 | 1/1994 | Kohmoto et al. | 359/601 |
| 5,357,367 | 10/1994 | Goldstein | 359/504 |

Primary Examiner—Thong Nguyen
Attorney, Agent, or Firm—Kane,Dalsimer,Sullivan, Kurucz,Levy,Eisele and Richard, LLP

[57] ABSTRACT

A scope apparatus is provided with an image forming optical system and a condenser lens on the exit side of the image forming optical system. The condenser lens is positioned so that a convex exit surface thereof is disposed in the vicinity of the image plane of the image forming optical system.

16 Claims, 8 Drawing Sheets

5,786,935

1

SCOPE

This application is a continuation of application Ser. No. 08/330,257, filed Oct.27, 1994, now abandoned.

BACKGROUND OF THE INVENTION

1. Field of the Invention

The present invention relates to a scope attached to a door at the entrance to a house or the like.

2. Description of Related Art

Conventionally, a door scope is attached to a door at the entrance to a house or an apartment to confirm a visitor from inside. This door scope is generally provided with a fisheye lens to see outside through a small viewing window. With the door scope, however, it is necessary to be close to the door and to look out of the small window, which makes it hard to see out of.

To eliminate the above drawbacks, in recent years, it has been proposed to use a scope comprising an objective lens and an eyepiece, the eyepiece comprises a plano-convex lens which is fixed to the eyepiece in such a manner that the flat surface of the lens faces the eye of the observer. With this scope, the observer does not have to be very close in order to look out of the window, but several drawbacks remain. Firstly, the visual field of the observer becomes narrow since a fisheye lens is not used. Secondly, the overall size of the scope becomes large and the thickness of the scope becomes greater than that of the door which results in the scope projecting beyond the door dimensions, this causes an obstruction and spoils the aesthetic appearance of the door. Further, when the entrance opening of the scope is enlarged to maintain brightness, the visitor may be surprised by its appearance. Besides, in order to be inconspicuous a sufficiently thick door is required.

To reduce the thickness of the scope, it is possible to select a wide angle lens with a short focal length. However, in such a case, the curvature image plane becomes large which leads to an unclear image.

When the power of the objective lens is increased at the same time as a widening of the lens view angle, aberration is also increased. Further, another measure to reduce the thickness of the scope by reducing the number of optical elements such as lenses used in the scope apparatus. However, in this case also, aberration is increased, which may cause coma flare.

As described above, in order to miniaturize the scope, and especially to reduce the thickness thereof, there are many optical problems to be solved.

SUMMARY OF THE INVENTION

It is therefore the object of the present invention to provide a small scope with a wide visual field and a clear image.

To achieve the objects mentioned above, according to the present invention, there is provided a scope apparatus comprising, an image forming optical system including an objective lens, and a condenser lens disposed on an exit side of the image forming optical system. An exit surface of the condenser lens is convex, furthermore, the condenser lens is disposed such that the exit surface thereof is positioned in a vicinity of an image plane of the image forming optical system.

To achieve the object mentioned above, according to the present invention, there is provided a scope comprising, an image-forming optical system including an objective lens, a condenser lens disposed on an exit side of the objective lens, and a diffusion surface formed on a surface positioned at a last exit side of the optical element of said image-forming optical system, wherein the diffusion surface is situated in the vicinity of the image plane of the image-forming optical system.

BRIEF DESCRIPTION OF THE DRAWINGS

The invention will be described below in detail with reference to the accompanying drawings, in which.

DESCRIPTION OF THE PREFERRED EMBODIMENTS

A scope apparatus according to a preferred embodiment of the present invention will be explained with reference to the drawings. In the scope apparatus according to the present invention, the focal length thereof is shortened to reduce the thickness of the apparatus thereof (that is, the dimension in the direction parallel to the optical axis), the visual field is widened by widening the lens angle, flare caused by the above measures is eliminated, and the recognizability thereby is improved with a variety of measures.

Figure 1:
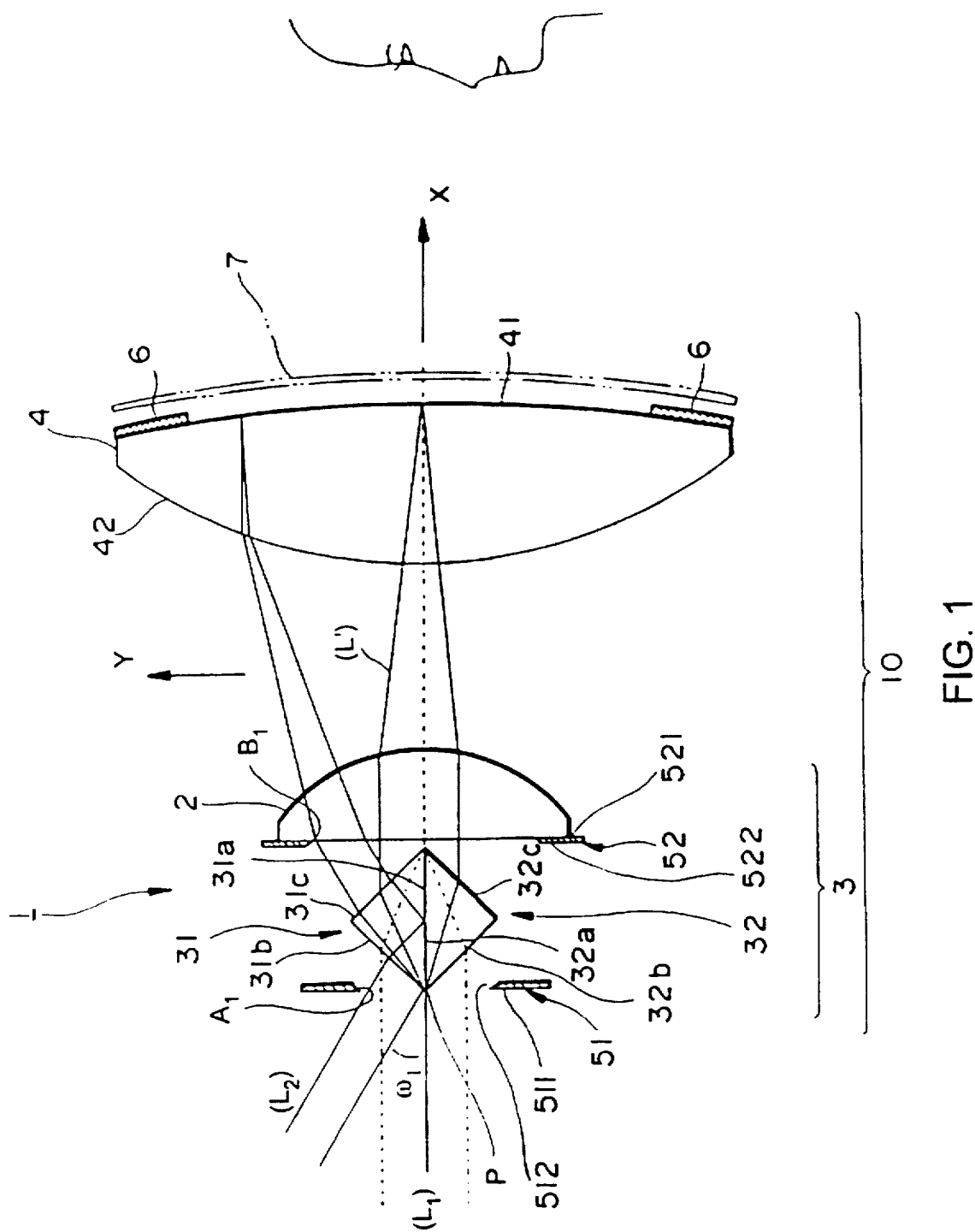
FIG. 1 is a side view of the overall configuration of optical elements of the scope according to the present invention.
Figure 2:
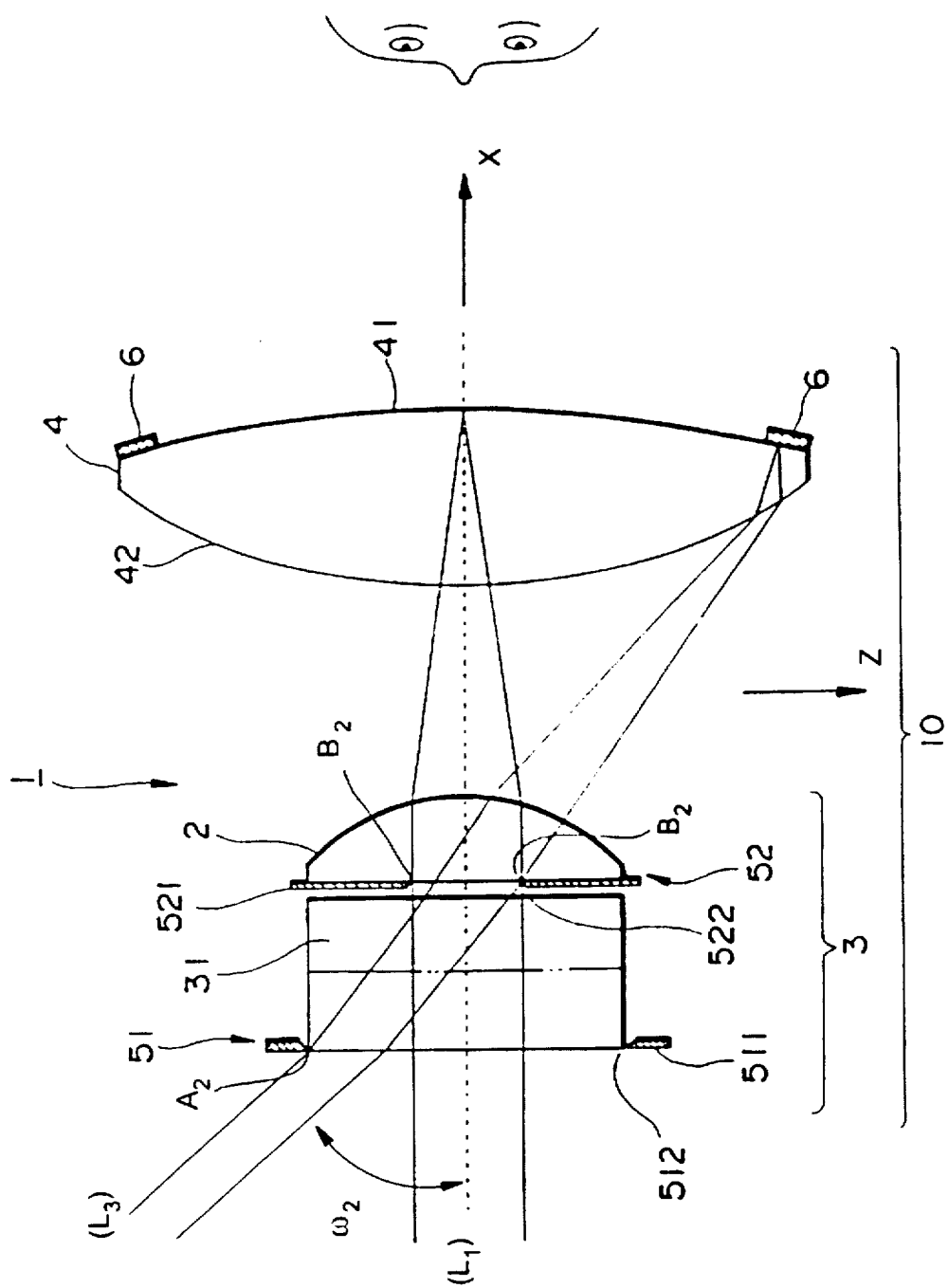
FIG. 2 is a plan view of the overall configuration of optical elements of the scope according to the present invention.

FIGS. 1 and 2 are a side view and a plan view respectively showing an embodiment according to the present invention as applied to a door scope.

As clearly illustrated in the figures, the scope 1 is provided with an optical system 3 comprising an objective lens 2 and Dove prisms 31 and 32 disposed on the incident side of the objective lens 2, and a condenser lens 4 disposed on the exit side of the objective lens 2. In this embodiment, an image-forming optical system 10 comprises the dove prisms 31 and 32, the objective lens 2 and the condenser lens 4. In FIGS. 1 and 2, the left side is defined as the entrance side (object space) and the right side is the exit side (image space).

The dove prisms 31 and 32 are mounted together with their reflection planes 31a and 32a thereof joined with each other, and when the scope apparatus 1 is installed, the dove prisms 31 and 32 are vertically arranged. The dove prisms 31 and 32 function as an image-correcting optical system to make image appear the correct way up. In other words, light passing through the dove prisms 31 and 32 is reflected by the reflection planes 31a and 32a to turn the image upside down, so the final image is formed the correct way up at the image forming plane. In place of the dove prisms, it is possible to use a lens or the like to use the image upside down. However, dove prisms are preferably used since the distance between optical elements can be shortened. The apex angle of the dove prisms 31 and 32 may be set at 90 degrees, but the angle is not limited to 90 degrees.

The objective lens 2 is a plano-convex lens of which the plane face is on the entrance side. However, a double-convex lens, a meniscus lens, or an optical element group including a plurality of lenses may be used for the objective lens 2. The objective lens 2 of the scope according to the present invention has a shorter focal length in comparison to that of a conventional scope.

The light passing through the dove prisms 31 and 32 forms image at an image-forming plane (focus) via the objective lens 2. An exit surface screen 41 is formed on the condenser lens 4 is situated at the image-forming plane (this is the plane of the focused image). As described above, in the case where the focus of the objective lens 2 substantially coincides with the exit surface of the condenser lens 4, the focal length can be shortened and the distance between the condenser lens 4 and the objective lens 2 can be shortened by using a wider angle from the small radius of curvature of the objective lens 2 without changing the exit diameter, that is, the diameter of the condenser lens 4.

Further, since the focal length of the objective lens 2 is short, a sufficient brightness for the optical system is maintained in spite of the small entrance opening. As a result, as the dove prisms 31 and 32 are positioned closer to the objective lens 2, the dimensions of the dove prisms 31 and 32 can be reduced.

With the above configuration, the distance between the optical elements can be reduced in the direction of the optical axis, which allows the overall thickness of the scope apparatus 1 to be decreased and the size of the entrance opening to be reduced.

By reducing the radius of curvature of the objective lens 2, that is, by increasing the power of the lens, the image-forming plane of the objective lens 2 becomes more curved therefore the screen. The exit surface screen 41 of the condenser lens 4 at the image-forming plane is convex.

As described above, the exit surface screen 41 is disposed close to the image forming position and is curved because the image plane is also curved by comparison with the case in which the exit surface of the condenser lens is a flat plane which would cause a distortion of the final image. As a result of curving the screen, defocusing of the image is restricted and a clearer image is formed on the exit surface screen 41 of the condenser lens 4. The exit plane 41 of the condenser lens 4 may be selected from among a spherical surface, an aspherical surface and a Fresnel surface.

The position of the exit surface screen 41 should coincide with the curvature of the image plane, which further restricts fading of the image. As a result, a much clearer image is obtained on the exit surface screen 41 of the condenser lens 4.

Further, when the incident surface 42 of the condenser lens 4 is formed as a convex surface to provide a double-convex lens, the curvature on the entrance side can be gentle, which permits coma of the condenser lens 4 to be reduced. When the power of the condenser lens 4 is increased to reduce the thickness of the scope apparatus 1, coma is also liable to increase. In such a case, the power of the lens is dispersed to both incident and exit surface 42 and 41 to restrict coma.

Therefore, to obtain a clearer image as well as to reduce the thickness of the scope apparatus 1, it is preferable to form the condenser lens 4 as a double-convex lens. This shape of the lens is easily manufactured due to its gentle curvature in comparison with a plano-convex lens with the same power, which provides another advantage.

When the power of the condenser lens 4 is reduced, the rays emitted from the exit surface do not travel directly to the observer, this generates a shadow on the observed plane. To prevent this phenomenon, it is effective to increase the power of the condenser lens and by using a double-convex lens. Further, it is possible to include some degree of freedom in the design by dividing the double-convex condenser lens 4 into a plurality of pieces and forming both incident and exit surfaces as convex surfaces to desirably correct coma and the like.

It is also possible to prevent an increase of coma by using a Fresnel lens with a positive power at the exit surface 41 of the condenser lens 4, this further makes the lens 4 thinner.

The exit surface 41 of the condenser lens 4 is formed as diffusion surface. An image is projected onto this diffusion surface and the projected image is recognizable in this embodiment. The existence of the diffusion surface prevents objects on the exit side of the scope apparatus 1 from forming an image on the entrance side (one-way recognizability). As a result, even if the visitor looks in at the scope apparatus 1 from the entrance side, he or she cannot observe inside the door from outside. This diffusion surface may be frosted surface, or mesh like a silk screen or fabrics may be applied to a surface to form such diffusion surface.

Such a diffusion surface is also obtained with a closely spaced continuously smooth waved surface. To prevent the inside from being observed, it is sufficient that a plurality of contour lines with a cross section similar to a continuous smooth waved surface with a repetitive periodic nature, covers the surface in a prescribed manner. With this shape, the inside can not be observed by the visitor unless the observer in a room comes close to the scope. In other words, even if the contour line are not provided with discontinued points like on the rough surface, it is enough to prevent the above problem if the contour line mostly continue at all points on them and the curve gradually varies thought in a sine curve manner.

The rate of gradual change in the sine type curve is desired to be in the range approximately from 1 mm to 0.001 mm preferably from 0.3 mm to 0.01 mm. With this design, the inside of the room is prevented from being observed by the visitor. It is possible to shape a part or all surface positioned at most exit side in the image-forming optical system as smooth diffusion surface.

As described above, in the case where the diffusion surface is formed from a sine type curve, it is possible to obtain a high degree of transparency of the image and to easily recognize the image being formed on the screen 41. In the diffusion surface described above, even if the contour line of the surface does not coincide with or resemble the curvature of the image plane, that is, even the screen is formed flat, a clear image is still recognizable. In the case where the diffusion surface resembles the curvature of the image plane, a clearer image is obtained, and a much clearer image is obtained when the diffusion surface coincides the curvature of the image plane.

Figure 3:
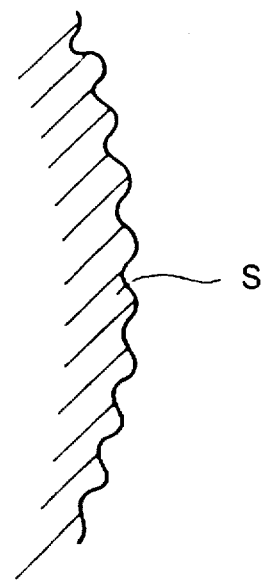
FIG. 3 is an enlarged cross-sectional view of the diffusion surface.
Figure 4:
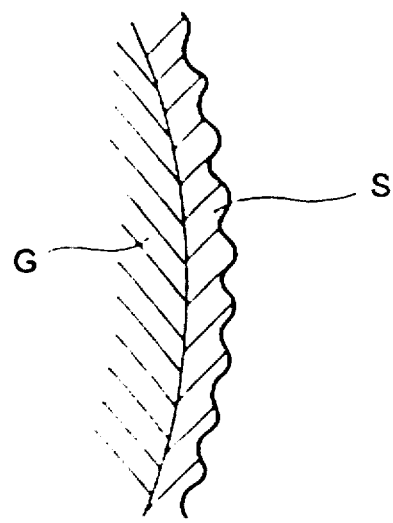
FIG. 4 is an enlarged cross-sectional view of the diffusion surface formed by applying optical resin to the surface of a glass material.

The diffusion surface is manufactured by forming optical resin S as illustrated in FIG. 3 or a combining technique for forming the special resin S on a glass base G may be applied as illustrated in FIG. 4. Further, it is possible to form the diffusion surface on glass material by molding the material itself.

Apertures 51 and 52 are disposed on the incident and exit sides of the dove prisms 31 and 32. Light interrupting plates 511 and 521 with openings 512 and 522 are used as the apertures 51 and 52.

In the first aperture 51 on the incident side, the width of the rays which enter the dove prisms 31 and 32 in the vertical direction, that is, the direction perpendicular to the reflection surface of the dove prisms 31 and 32 (hereinafter called as the "Y-direction" is smaller than the width thereof in the direction parallel to the side on which the incident surfaces 31b and 32b and the exit surfaces 31c and 32c of the dove prisms 31 and 32 cross (hereinafter referred as the "Z-direction" by the light interrupting plate 511. The direction of the optical axis is hereinafter called as the "X-direction".

Further, the shape of the opening 512 is a rectangle to restrict the rays which enter the dove prisms 31 and 32. The length of the opening 512 in the Y-direction is shorter than that in Z-direction.

The shape of the opening 522 of the second aperture 52 is also rectangular, and the length of the opening 522 in Y-direction is shorter than that of the objective lens. Further, the length of the opening 522 in the Z-direction is shorter than that in the Y-direction thereof. The shape of the openings 512 and 522 of the apertures 51 and 52 is not limited to a rectangle but may be an elliptic for example.

In the case where parallel rays are incident on the objective lens 2, the image-forming efficiency of the objective lens 2 is better when the rays pass through the center of the lens. On the other hand, when rays with a large incident angle ω1 and ω2 (angles between the rays and optical axis) pass through the center of the objective lens 2, the efficiency is better than the case in which the rays pass through the circumferential edge of the lens 2. The apertures 51 and 52 restrict the width of the rays in the direction perpendicular to the direction that the rays travel. As a result, when the rays pass through the apertures 51 and 52 one after another the rays traveling parallel to the optical axis are blocked at the circumference edge of the objective lens 2, which prevents coma flare of the image due to coma aberration at the circumference of the objective lens 2 caused by the parallel ray.

In FIGS. 5A, 5B, 6A and 6B, the point (η, ζ) on Y-Z plane shows the point on lens coordinate in which the effective outer periphery of the objective lens is normalized to "1", and Δy and Δz are coma aberration. The shaded area in the figures are in the range that the rays are interrupted by the apertures 51 and 52.

Figure 5A:
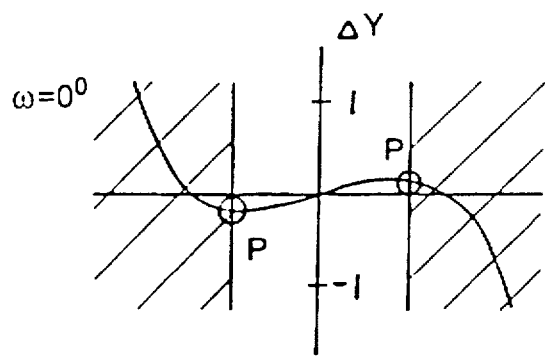
FIG. 5A and 5B are graphs showing the relationship between the position on the objective lens and transverse aberration (in Y-direction)

The central ray $L_j$ of the bundle of rays which enters the dove prisms 31 and 32 at ω1=0° in the direction parallel to the optical axis is changed to a marginal ray $L_{i}$, on the incident and exit sides of the dove prisms 31 and 32 as illustrated in FIGS. 1 and 5A. In other words, the rays which enters the objective lens 2 are restricted between the point P at the apex of the dove prisms 31 and 32 and the aperture 55 and 52. This prevents peripheral rays from pass through the objective lens 2. As a result, these rays which cause coma flare are blocked.

Figure 5B:
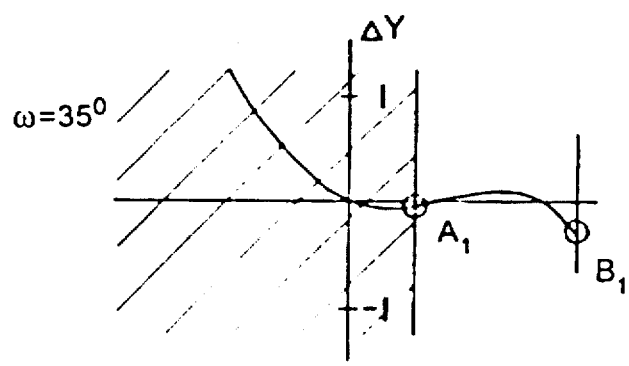

Referring to FIGS. 1 and 5B, the rays L2 which enters at ω1=35° are restricted by the end portion A1 of the first aperture 51 on the incident side of the dove prisms 31 and 32. Therefore, the rays passing through the center of the objective lens with poor image-forming efficiency are interrupted. It is preferable that the length of the opening 512 of the first aperture 51 in the Y-direction is almost the same as or smaller than the thickness of the dove prisms 31 and 32 in the Y-direction, that is, the distance between the apexes of the dove prisms 31 and 32.

Further, the rays passing through the aperture 51 and the dove prisms 31 and 32 are restricted by the end portion B1 of the second aperture 52. As described above, the rays which are incident on the peripheral portion of the objective lens are similarly blocked as illustrated in FIGS. 1 and 5B. With the configuration including the dove prisms 31 and 32 as optical members, coma flare in the Y-direction is preferably reduced, which permits the width of the second aperture 52 in the Y-direction to be increased. As a result, the width of the first aperture 51 Xn the Y-direction is decreased.

Figure 6A:
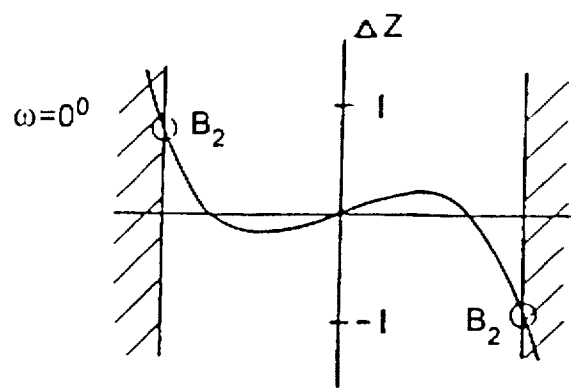
FIGS. 6A and 6B are graphs showing the relationship between the position on the objective lens and transverse aberration (in Z-direction)

The second aperture 52 mainly restricts the width of the bundle of rays in the Z-direction. Referring to FIGS. 2 and 6A, the rays $L_i$ which enter the dove prisms 31 and 32 at ω2=0° in the direction parallel to the optical axis are restricted by the end portion B2 of the second aperture 52 in the Z-direction, while the width of the rays in the Y-direction is restricted by the dove prism 31 and 32 as shown in FIG. 1. As a result, the rays entering the peripheral portion of the objective lens 2 are interrupted and the large coma flare are removed as illustrated in FIG. 6A.

Figure 6B:
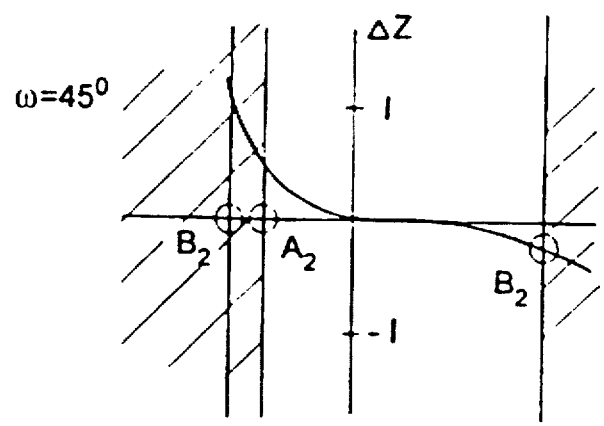

Referring to FIGS. 2 and 6B, the rays $L_s$ entering at ω2=45° are restricted by the edge B2 of the opening 522 of the second aperture 52 which mainly restricts the rays entering at ω2=0°, and the rays entering the end portion of the objective lens 2 are interrupted. In the embodiment shown in FIG. 6B, the rays are restricted by the edge A2 due to the relatively large angle of ω2=45°. On the other hand, when the angle ω2 is small, the rays are mainly restricted by the edge B2. The dimension of the aperture 51 in the Z-direction can be sufficiently large so as to receive a large amount of rays with large angle ω2 on the Z-X plane.

As described above, with the apertures 51 and 52, the vertical field angle, that is, the field angle in the Y-direction is 70°, and the horizontal field angle, that is the field angle in the Z-direction is 90°, which permits the observer to recognize a plurality of visitors at the same time.

As explained above, with the first aperture 51, an outwardly exposed portion of the scope apparatus 1 attached to the door is vertically short and horizontally long, which is appeared to be small by the visitor. As a result, the scope 1 is inconspicuous on the door so that the visitor is not surprised.

Other than the light interrupting plate, the second aperture 52 may be formed by utilizing the objective lens 2 itself, for instance, by forming the outline of the lens as ellipse to meet the shape of the second aperture 52. In this case, the number of optical elements for the scope can be reduced.

With the apertures 51 and 52, the optical path of the rays are adjusted in such a manner that the parallel rays pass through the center of the objective lens 2 and the rays with large incident angles ω1 and ω2 pass through the periphery of the objective lens 2. In other words, only the rays contributing to the improved image-forming efficiency pass through the objective lens 2, which decreases aberration caused by increased power of the objective lens 2 and the condenser lens 4 and the single condenser lens 4.

In the scope apparatus 1 described above, some of the rays are interrupted by the apertures 51 and 52 as explained above, which prevents the peripheral portion of the exit plane 41 of the condenser lens 4 from forming image.

Therefore, the peripheral potion is negligible and the appearance of the scope apparatus is spoiled. To eliminate the above drawbacks, a light interrupting portion 6 is provided with a cover on the peripheral portion of the exit surface 41. With the light interruption portion 6, a clear image is strengthened and the recognizability thereof is further improved. The shape of the picture formed by the light interrupting portion 6 becomes a horizontally long ellipse or the like.

The diffusion surface may be independently mounted as a diffusion member 7 which is indicated by two-dot chain lines as illustrated in FIG. 1. In this case, the diffusion member with a convex surface toward the eye of the observer provides clearer image, and further clearer image is obtained by forming the convex surface along the curvature of field of the objective lens 2, that is forming the surface so as to coincide with or resemble the curvature of the objective lens.

If one-way recognizability is unnecessary, the configuration without diffusion surface and diffusion member is possible. In this case, a further clearer image is obtained.

The condenser lens 4 described above is not limited to double-convex lens and may be selected from among a plano-convex lens of which the convex surface is on the exit side, a convex meniscus lens, or an optical element group including a plurality of lenses.

The material of the dove prisms 31 and 32, the objective lens 2 and the condenser lens 4 may be selected from plastic and glass, and the optical characteristic of these elements such as refractive index, transmittance, Abbe's number and coatings are not limited.

The optical system 3 including the objective lens 2 is not limited to the system with the dove prisms 31 and 32, but other optical systems may be used as an image inverting system to make the image appear upright on the image-forming plane. Further, optical systems in which image is formed on the image-forming plane is not upright may be adopted in this invention.

As other image inverting optical systems such as a Porro prism, Abbe prism, or relay lenses may be used. Optical elements such as filters, mirrors, lenses, prisms, beam splitters and glass plates may be added to the optical system 3. Such optical elements may be disposed between the optical system 3 and the condenser lens 4, or on the exit side of the condenser lens 4.

Figure 9A:
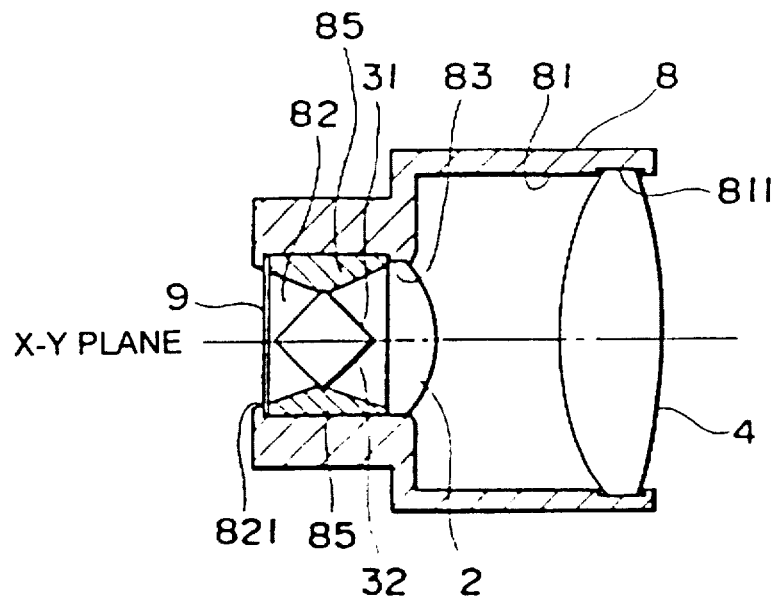
FIGS. 9A and 9B are side cross-sectional view of the scope according to the present invention and horizontal cross-sectional view of the scope, respectively.
Figure 9B:
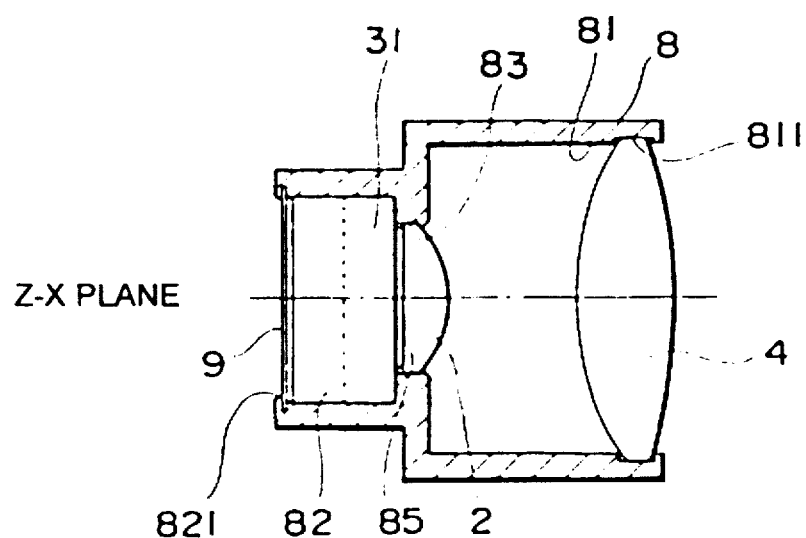

FIGS. 9A and 9B is a side cross-sectional view and a plan cross-sectional view of the scope in which the image-forming optical system 10 is accommodated in a cylindrical accommodating member 8. In the accommodating member 8, a cover glass 9, the dove prisms 31 and 32, the objective lens 2 and the condenser lens 4 are arranged in this order on the same optical axis from the entrance side to the exit side.

The accommodating member 8 is provided with a portion 81 with a large diameter and a prism accommodating portion 82 at the entrance thereof, and the objective lens accommodating portion 63 is formed between them.

A groove extending in the circumferential direction is formed on the inner surface of the portion 81 with large diameter in the vicinity of the exit side end thereof to provide a condenser lens accommodating portion 811. The periphery of the condenser lens 4 is inserted into the groove to hold it.

The prism accommodating portion 82 is a rectangular opening, and a pair of securing members 85 are attached to upper and lower surfaces as illustrated in FIG. 9A. The dove prisms 31 and 32 are supported between the pair of securing members 85. Further, the securing members 85 abuts the objective lens 2 accommodated in the accommodating portion 83 to restrict the movement of the objective lens 2 in the direction parallel to the optical axis.

A cover glass accommodating portion 821 with inward projections is situated at the entrance to the prism accommodating portion 82. A rectangular cover glass 9 is pushed toward the cover glass accommodating portion 821 from inside and the ends of the securing members 85 abut the cover glass 9 to hold it in position.

The projections of the cover glass accommodating portion 821 abut the end of the cover glass 9 to seal the inside of the accommodating member 8 from open air. As a result, there is no danger that dust can accumulated in the scope, so cleaning of the optical system in the scope is unnecessary. Therefore, there is no danger of shifting the optical axes of the prisms and lenses during cleaning, which prolongs the life of the optical system. Further, with the configuration described above, the mechanism for securing the dove prisms 31 and 32 can be simplified.

Further, with the above configuration, the end portions of the securing member 85 which abut the objective lens 2 and the cover glass 9 may be inwardly projected to form the apertures 51 and 52.

The scope apparatus 1 according to the present invention is attached to a door of an apartment, a guest room of a hotel, a cabin and the like. In such a case, the scope 1 is mounted to the door such that the side that the dove prisms 31 and 32 face outside.

The scope apparatus 1 according to the present invention is used not only for a door but also for a wall and the like to watch a neighboring room, for instance. According to the usage of the scope 1, the diffusion surface or diffusion member 7 may be omitted, that is, the entrance and exit planes may be used as transmission planes.

Figure 7A:
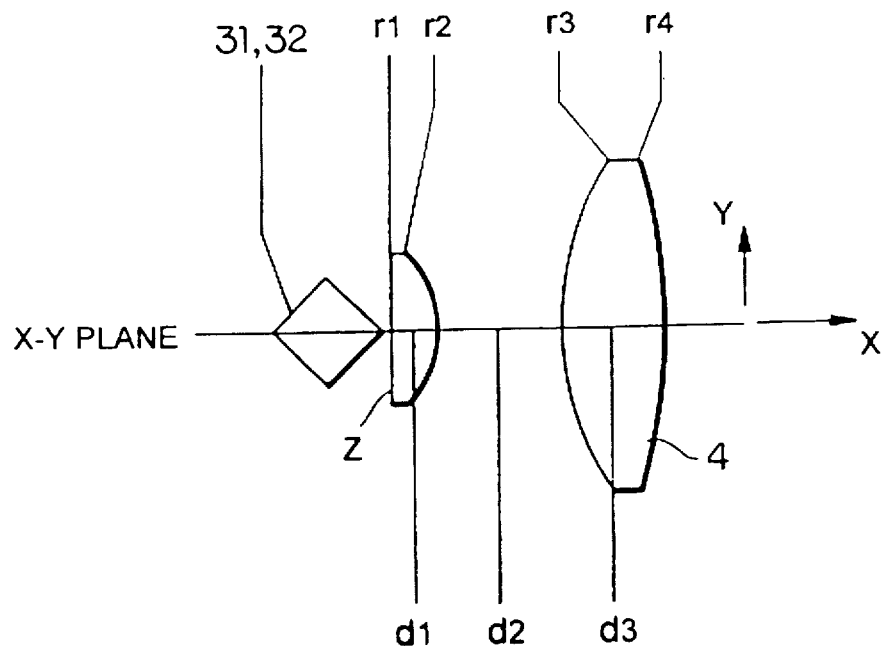
FIGS. 7A and 7B show the configuration of the optical elements of the image-forming system of the scope.
Figure 7B:
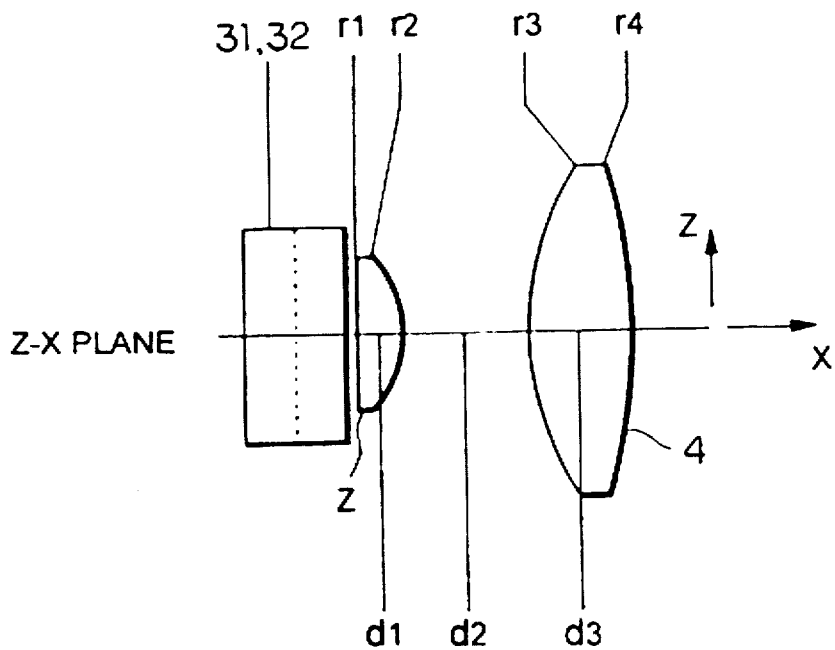

Next, preferred embodiments of the scope with the above construction will be explained in detail. The configuration of the image-forming optical system 10 of the scope is illustrated in FIGS. 7A and 7B and the specification of the system is shown in Table 1.

TABLE 1

| $F_e$ = 3.62 (vertical) | f = 23.82 | m = −0.049 | |
|---|---|---|---|
| 1.59 (horizontal) | $f_B$ = 2.73 | | |
| NO. | r | d | $n_d$ | $v_d$ |
| 1 | ∞ | 6.00 | 1.51633 | 64.1 |
| 2 | −14.300 | 16.00 | — | |
| 3 | 40.000 | 13.00 | 1.51633 | 64.1 |
| 4 | −80.000 | — | — | |

$F_e$: Effective F-number
f: focal length
m: magnification
$f_B$: back focus
ω: half field angle
r: radius of curvature
d: surface separation (the lens thickness or the distance between the lenses)
$n_d$: refractive index of d-line
$v_d$: Abbe's number of d-line

[Dove prism]

Length of reflection surface in X-direction (direction parallel to optical axis): 14.0 mm Height from reflection surface to apex (in Y-direction): 7.0 mm Length of reflection surface in Z-direction: 24 mm Refractive index nd: 1.51633

Abbe's number νd: 64.1

[Objective lens]

| Shape: Plano-convex | Diameter: 21.0 mm |
|---|---|

[Condenser lens]
   Diameter: 46.0 mm
   Diffusion surface (rough surface) is formed on exit surface.
[Apertures]
[First aperture]
   Shape: rectangle
   Dimension: Length in Y-direction; 14.0 mm
   Length in Z-direction; 24.0 mm
[Second aperture]
   Shape: rectangle
   Dimension: Length in Y-direction; 18.0 mm
   Length in Z-direction; 15.0 mm
[Configuration]
   Distance between dove prisms and objective lens: 1.0 mm
[scope]
   Effective F-number:
      3.62 (vertical),
      1.59 (horizontal)
   Dimension of image circle:
      29 mm (Y-direction),
      45 mm (Z-direction)
   Incident angle on Z-X plane; $\omega 2 = \pm 50°$
   Incident angle on X-Y plane: $\omega 1 = \pm 35°$ The scope with the above configuration was attached to a door and an image was formed on the exit plane of the condenser lens. FIGURES 5A and 5B show the aberration on the image-forming surface at that time. In the figures, the X-axis is the optical axis of the condenser lens and the Y-axis the exit surface (standard surface).

Figure 8A:
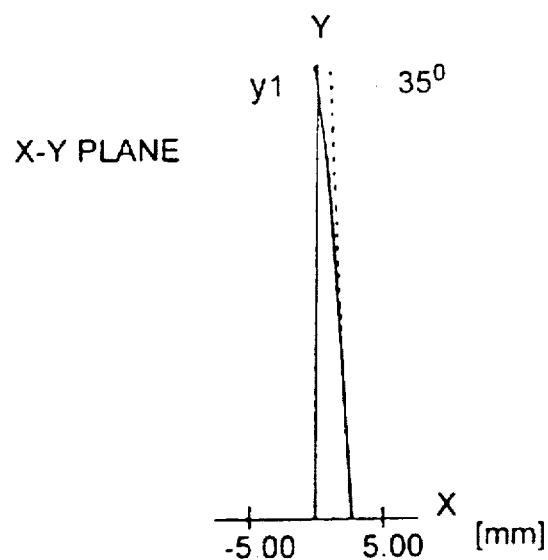
FIGS. 8A and 8B show aberration of the curvature of field on the image-forming plane when the image is formed on the exit plane of the condenser lens.
Figure 8B:
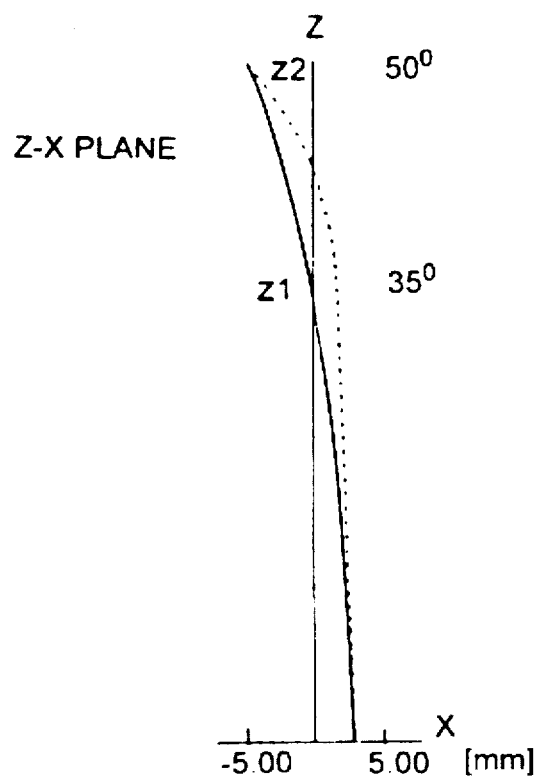

The curve with a solid line shows the aberration in the sagittal plane and the curve with a broken line shows the aberration on the meridional plane. For example, the ray entering at $\omega 1 = 35°$ forms an image at the position y1 in FIG. 8A, the ray entering at $\omega 2 = 35°$ forms an image at the position z1 in FIG. 8B and the ray entering at $\omega 2 = 50°$ forms an image at the position z2 in FIG. 8B.

A bright and very clear image was observed, and when the scope was looked from the entrance side, an image on the observer's side was not recognized.

As explained above, with the scope according to the present invention, the focal length of the objective lens is shortened, which provides a wide visual field (wide lens angle) and miniaturized body (thin body). Further, the increase of coma flare caused by the short focal length is eliminated, resulting in high image-forming quality. For instance, when used for a door scope, the scope is inconspicuous, so the appearance of the door is not spoiled.

The above image-forming quality is further improved by causing the exit surface of the condenser lens to coincide with the curvature of the objective lens. When a double-convex lens is applied to the condenser lens, the above quality is further improved.

With the dove prisms, the image is formed on the image-forming plane in upright-state, resulting in an improved recognizability of the visitor.

With the diffusion surface, even if the scope is looked at from the objective lens side, the image on the eyepiece side can not be recognized. Especially used as a door scope, it is possible to see images from inside only.

When apertures are situated on entrance and exit sides of the dove prisms, and especially the shape of the apertures is designed as describe above, the coma flare and the like on the image-forming plane will be further reduced, resulting in a further improved image-forming quality. In this case, it is possible to cover or shade with a light interrupting portion, which is formed on the image-forming plane by the apertures, resulting in further recognizable image-forming plane.

We claim:

1. A scope apparatus comprising:
   an image forming optical system including an objective lens at an entrance side of said image forming optical system and a condenser lens disposed on an exit side of said image forming optical system;
   wherein an image-forming plane of said image forming optical system has a convex curvature, an exit surface of said condenser lens having a convex curvature corresponding to said convex curvature of said image-forming plane, and wherein said condenser lens is disposed such that said convex curvature of said exit surface is positioned to coincide with said convex curvature of said image-forming plane.

2. A scope apparatus as claimed in claim 1, wherein a diffusion surface is provided in a vicinity of said image-forming plane of said image forming optical system.

3. A scope apparatus as claimed in claim 2, wherein said exit surface of said condenser lens is said diffusion surface.

4. A scope as claimed in claim 2, wherein said diffusion surface further comprises a plurality of contour lines perpendicular to an optical axis being substantially continuous at all points thereon, and follows a continuous smooth wave shape perpendicular to said optical axis with a periodic nature across said diffusion surface.

5. A scope apparatus as claimed in claim 4, wherein a material of said diffusion surface is one of optical resin and glass.

6. A scope apparatus as claimed in 1, wherein said condenser lens is a double-convex lens.

7. A scope apparatus as claimed in claim 1, further comprising, an image inverting optical system which makes an image formed by said image forming optical system upright.

8. A scope apparatus as claimed in claim 7, wherein said image inverting optical system is a pair of dove prisms located on the incident side of said objective lens, wherein reflection surfaces of of said dove prisms are combined with each other.

9. A scope apparatus as claimed in claim 8, wherein a first aperture is disposed on the incident side of said dove prisms.

10. A scope apparatus as claimed in claim 9, wherein an opening of said first aperture being formed such that a length of said opening in a direction parallel to said reflection surfaces of said dove prisms is longer than a length of said opening in a direction perpendicular to said reflection surfaces.

11. A scope apparatus as claimed in claim 10, wherein a second aperture is disposed on the exit side of said dove prisms.

12. A scope apparatus as claimed in claim 11, wherein an opening of said second aperture being formed such that a length of said opening in a direction perpendicular to said reflection surfaces of said dove prisms is longer than a length of said opening in a direction perpendicular to said reflection surface.

13. A scope apparatus as claimed in claim 7, wherein a light interrupting portion is formed on the image-forming plane of said image forming optical system.

14. A scope comprising:

an image inverting optical system;

a first member having a rectangular aperture therein with opposed sides having an elongated longitudinal dimension, said first member being disposed on one side of said image inverting optical system;

a second member having a rectangular aperture therein disposed on an opposite side of said image inverting optical system, said second member aperture having opposed sides with an elongated dimension extending perpendicular to said first member rectangular aperture sides having an elongated longitudinal dimension, an objective lens having an entrance side on a side of said second member opposite to said image inverting optical system; and, a condenser disposed so that an exit surface thereof is positioned to substantially coincide with an image plane of said objective lens;

wherein said exit surface has a curvature corresponding to a curvature of said image plane.

15. A scope in accordance with claim 14 wherein said curvature of said exit surface is convex.

16. A scope in accordance with claim 14 wherein said image inverting optical system comprises a pair of dove prisms joined along a bonding plane and said opposed sides having said elongated longitudinal dimension are parallel to said plane.

* * * * *